(12) United States Patent
Watson et al.

(10) Patent No.: US 7,033,053 B2
(45) Date of Patent: Apr. 25, 2006

(54) HIGH/LOW BEAM ADJUSTER BRACKET ASSEMBLY

(75) Inventors: Phillip M. Watson, Indianapolis, IN (US); Jo Broshar, Anderson, IN (US); Travis S. Floyd, Howell, MI (US)

(73) Assignee: Guide Corporation, Pendleton, IN (US)

( * ) Notice: Subject to any disclaimer, the term of this patent is extended or adjusted under 35 U.S.C. 154(b) by 105 days.

(21) Appl. No.: 10/789,823

(22) Filed: Feb. 27, 2004

(65) Prior Publication Data

US 2005/0190571 A1 Sep. 1, 2005

(51) Int. Cl.
*F21S 8/10* (2006.01)

(52) U.S. Cl. .................. 362/515; 362/514; 362/507

(58) Field of Classification Search ............... 362/420, 362/421, 419, 514, 515, 283, 322, 324, 525, 362/238, 239, 250, 233
See application file for complete search history.

(56) References Cited

U.S. PATENT DOCUMENTS

| | | | |
|---|---|---|---|
| 1,514,869 A * | 11/1924 | Solosabal et al. ............ 362/54 |
| 3,614,416 A * | 10/1971 | Fleury ........................ 362/469 |
| 4,703,399 A | 10/1987 | Van Duyn et al. |
| 4,712,164 A | 12/1987 | McMahan et al. |
| 4,722,033 A | 1/1988 | VanDuyn et al. |
| 4,882,658 A | 11/1989 | Allen |
| 4,916,586 A | 4/1990 | Van Duyn et al. |
| 4,959,758 A | 9/1990 | Filosa et al. |
| 5,270,907 A | 12/1993 | Lisak |
| 5,483,425 A | 1/1996 | Luallin et al. |
| 5,483,426 A * | 1/1996 | Lewis et al. ................. 362/524 |
| 5,622,421 A | 4/1997 | Turley, Jr. et al. |
| 6,220,735 B1 | 4/2001 | Matubara |
| 6,540,386 B1 | 4/2003 | Fujino et al. |
| 2002/0054496 A1 | 5/2002 | Fujino et al. |
| 2003/0012028 A1 * | 1/2003 | Krieg et al. ................. 362/460 |

* cited by examiner

*Primary Examiner*—Sandra O'Shea
*Assistant Examiner*—Gunyoung T. Lee
(74) *Attorney, Agent, or Firm*—Ice Miller LLP

(57) ABSTRACT

The subject invention relates to automotive head lamp assemblies with a low beam unit and a high beam unit. In an exemplary embodiment, the low beam unit and high beam unit is connected to one another by an adjuster bracket. The adjuster bracket allows for two ball studs to interact with the adjuster bracket. The first ball stud interacts with the adjuster bracket and high beam reflector so that the high beam reflector's vertical axis can be adjusted to make it parallel to the vertical axis of the low beam reflector. The second ball stud interacts with the adjuster bracket and low beam reflector so that both the low beam reflector and high beam reflector are adjusted vertically at the same time and in the same direction.

14 Claims, 6 Drawing Sheets

HIGH/LOW BEAM ADJUSTER BRACKET ASSEMBLY

BACKGROUND OF INVENTION

An issued Federal Motor Vehicle Safety Standard (FMVSS) requires that headlamps that comprise a low beam unit and a high beam unit have one mechanism for adjusting the aims of both the low beam reflector and a high beam reflector. FIG. 1 shows a front view of a typical front lamp assembly 10 that was utilized in automobiles prior to the implementation of this safety standard. As shown in FIG. 1, the typical front lamp assembly 10 comprises a low beam unit 12 with a light source 22 and a high beam unit 14 with a light source 22 positioned in a single lamp housing 16.

FIG. 2 shows a cross sectional view of front lamp assembly 10 along line A—A of FIG. 1. As shown in FIG. 2, low beam unit 12 comprises a low beam reflector 20 and high beam unit 14 comprises a high beam reflector 24. High beam reflector 24 and low beam reflector 20 each have three ball sockets 26 (only two pictured) attached to the back of each reflector. Lamp housing 16 has two ball studs 28 in each low beam and high beam unit for a total of four ball studs (only two pictured). Further, low beam unit 12 and high beam unit 14 both have one adjustment screw 27 with a ball head 18 positioned within the unit. Lamp housing 16 and high beam/low beam reflectors 24 and 20 are attached to one another by snapping the ball studs 28 of the lamp housing into two of the ball sockets 26 on each of the reflectors and by snapping ball heads 18 of adjustment screws 27 into the third ball socket 26 on each of the reflectors. The threaded portion of each of these adjustments screws 18 passes through the lamp housing 16 so that the other end of the adjustment screw can be accessed on the other side of the lamp housing.

When either of the adjustment screws 18 is rotated, it will either extend the ball head 18 further away from the lamp housing or withdraw the ball head towards the lamp housing. As the ball head 18 is extended, the ball sockets 26 of the respective reflector will pivot about the ball studs 28 and the ball head 18 so that the reflector will tilt downward. As the ball head 18 is withdrawn, the ball sockets 26 will pivot about the ball studs 28 and the ball head 18 so that the respective reflector will tilt upwards. In order to adjust the aim of the low beam unit 12 and high beam unit 14, both adjustment screws 27 must be turned separately. Thus, the low beam reflector 20 and high beam reflector 24 are vertically aimed separately by turning either of the adjustment screws 27. These separate means for adjusting the aim of the low beam reflector and high beam reflector is now obsolete in view of the FMVSS.

BRIEF INVENTION SUMMARY

The subject invention relates to automotive head lamp assemblies that comprise a low beam unit and a high beam unit. Specifically, the subject invention relates to an apparatus and a method for vertically adjusting the aim of both the low beam unit and high beam unit at the same time and in the same direction. One embodiment of the subject invention comprises a low beam reflector and a high beam reflector connected to one another by an adjuster bracket. One end of the adjuster bracket is attached to the high beam reflector by a ball stud that is threaded through the bracket's threaded cylinder and snapped into a ball socket located on the high beam reflector. This ball stud can be extended or withdrawn so that the high beam reflector can be tilted upward or downward without adjusting the low beam reflector. The other end of the adjuster bracket comprises a ball socket that is attached to the low beam reflector. This ball socket accepts a second ball stud so that when the second ball stud is extended or withdrawn, the high beam and low beam reflectors will be vertically adjusted at the same time. The second ball stud can comprise a gear drive that can cause the ball stud to extend and withdraw.

In operation, the first ball stud will be extended or withdrawn in order to vertically adjust the high beam reflector so that its vertical access will be parallel to the vertical access of the low beam reflector. Once the vertical axis of both reflectors are parallel to one another, the second ball stud can be extended or withdrawn in order to vertically adjust both the low beam and high beam reflectors at the same time and in the same direction.

DETAILED DESCRIPTION OF THE INVENTION

Figure 1:
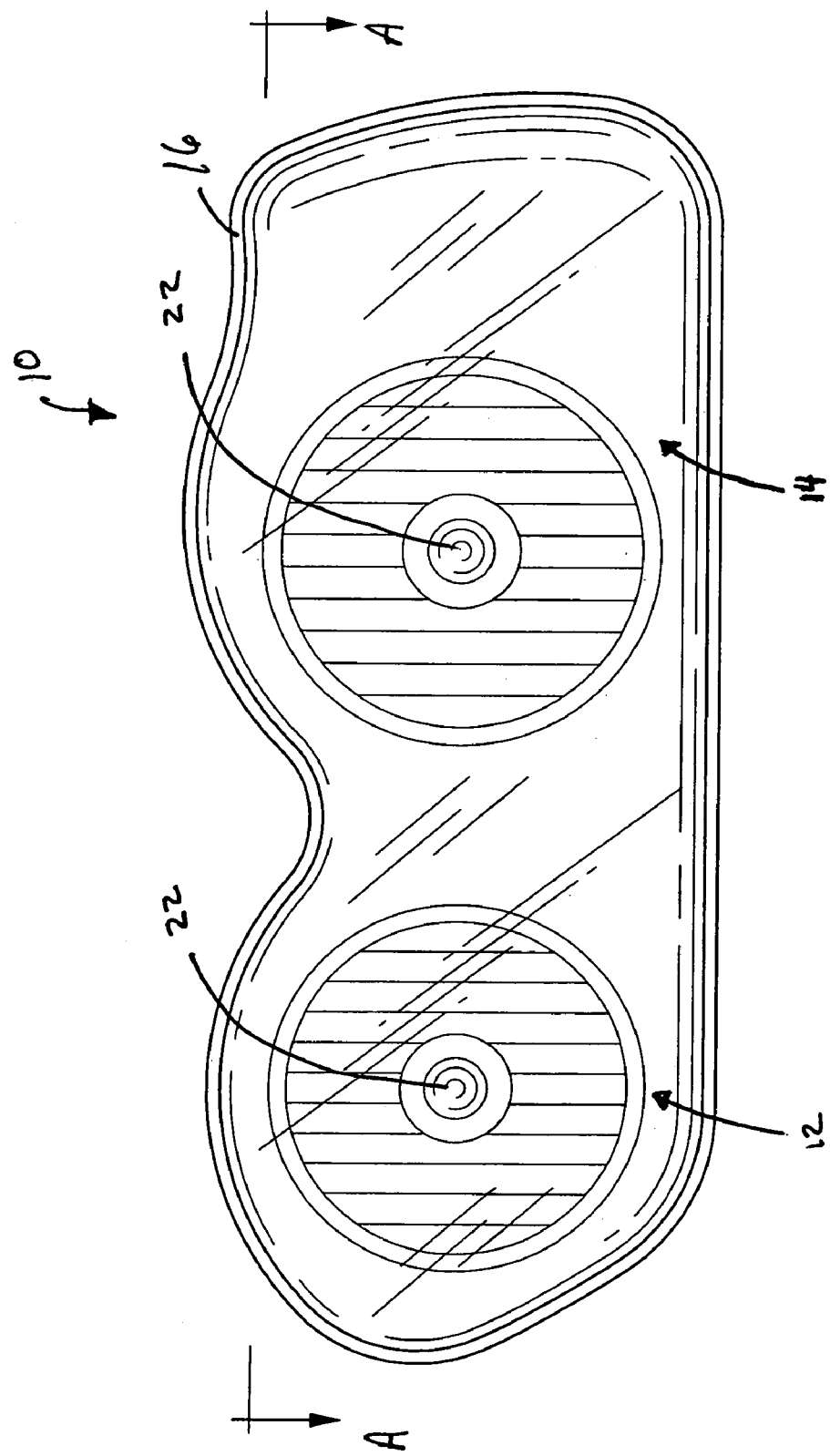
FIG. 1 is a front view of a typical front lamp assembly.
Figure 2:
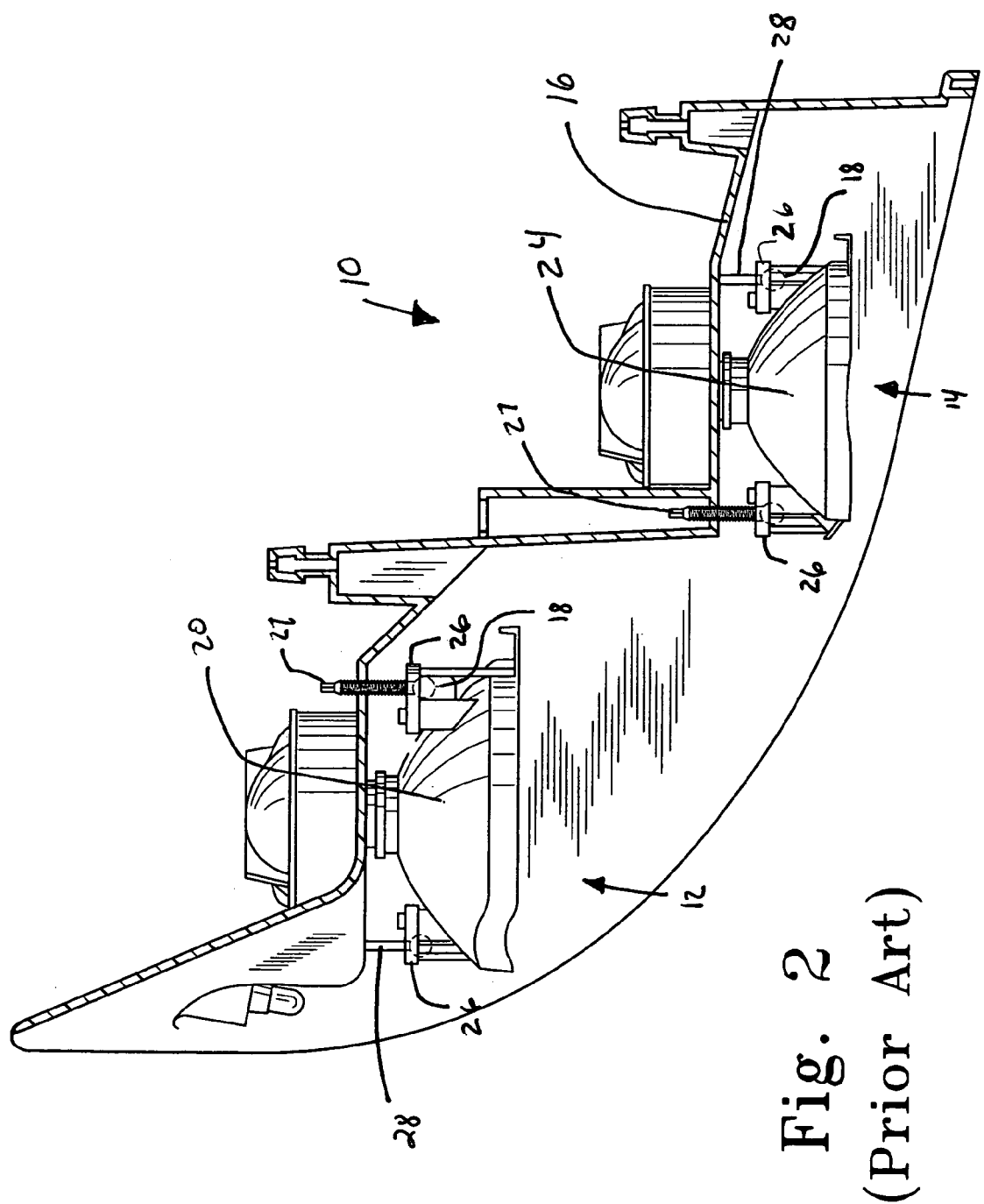
FIG. 2 is a cross-sectional top view of the front lamp assembly along line A—A of FIG. 1.
Figure 3:
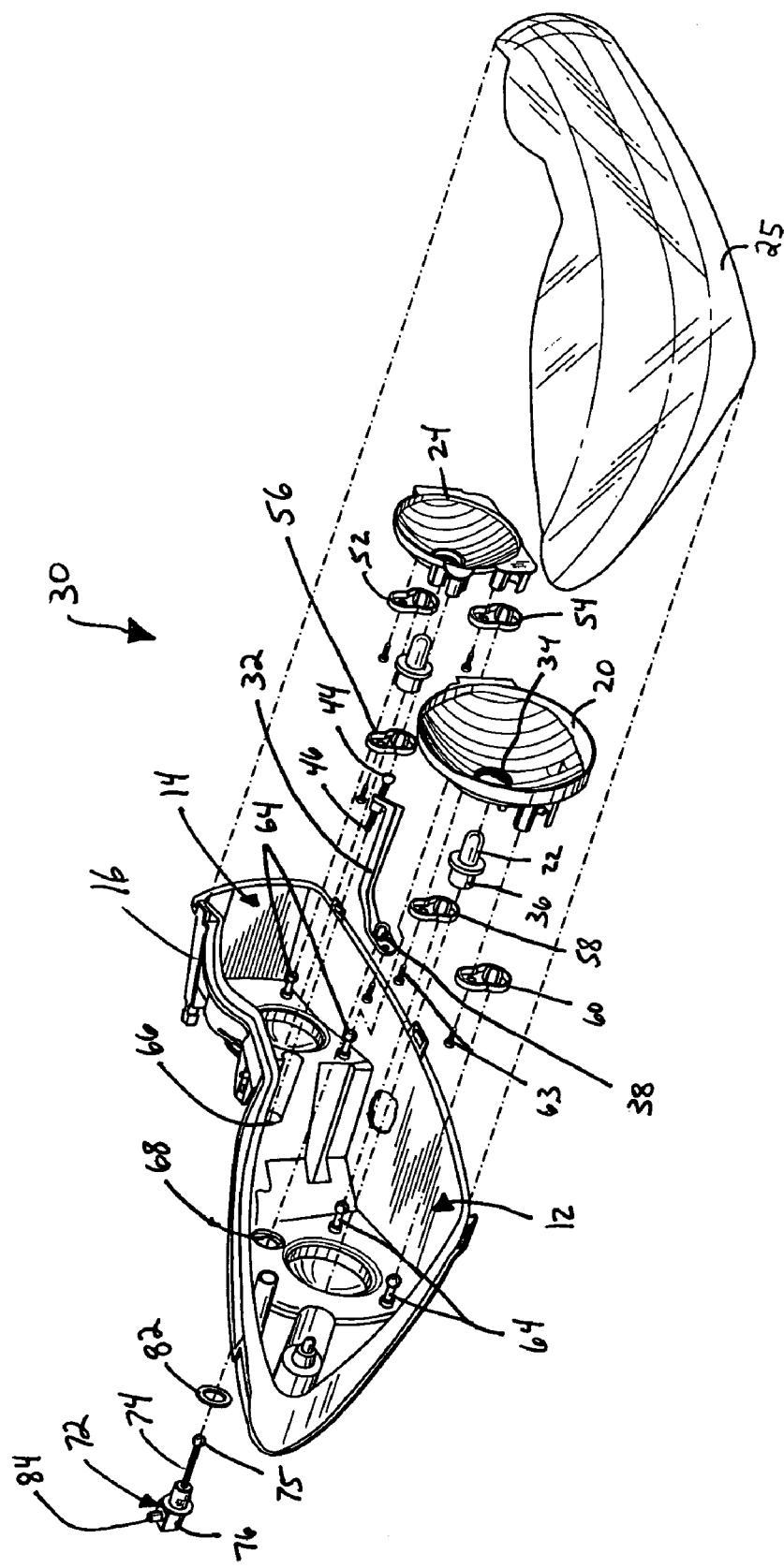
FIG. 3 is an exploded view of an exemplary embodiment of a passenger side headlamp assembly with an adjuster bracket.

FIG. 3 shows an exploded view of an exemplary embodiment of the high/low beam adjuster bracket assembly in a passenger side headlamp assembly 30. As shown in FIG. 3, headlamp assembly 30 comprises lamp housing 16 and a lens 25. Lens 25 and lamp housing 16 enclose high beam reflector 24 and low beam reflector 20. A lamp socket 36 and light source 22 are attached to each reflector through receiving hole 34.

Figure 4:
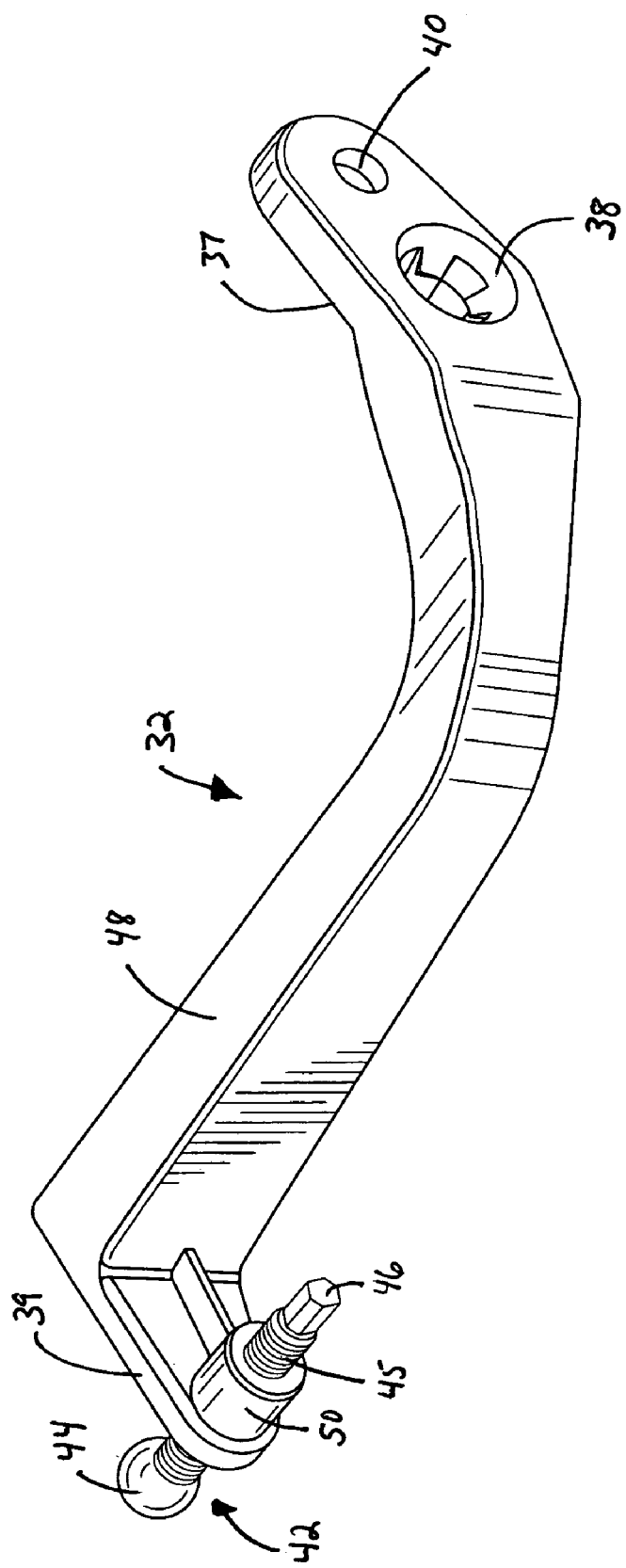
FIG. 4 is a perspective view of the adjuster bracket of FIG. 3.

Referring still to FIG. 3, an adjuster bracket 32 connects high beam reflector 24 and low beam reflector 20 to each other. FIG. 4 shows a perspective view of adjuster bracket 32. As shown in FIG. 4, this embodiment of the adjuster bracket 32 comprises a ball socket end 37 and a ball stud retaining end 39. Ends 37 and 39 are integral with and separated by an extension 48. Ball socket end 37 of adjuster bracket 32 comprises a ball socket 38 and a receiving hole 40. An adjustment ball stud 42 passes through and is retained by a threaded cylinder 50 located on the ball stud retaining end 39 of adjuster bracket 32. In this embodiment, ball stud 42 comprises a hex shape end 46, a threaded portion 45 and a ball head 44 that extends away from both ball socket end 37 and ball stud retaining end 39. Adjuster bracket 32 is shown as a right-handed adjuster bracket (i.e. an adjuster bracket used in the passenger side headlamp assembly). A left-handed adjuster bracket (i.e. an adjuster bracket used in a driver side headlamp assembly) has the same structure except that it is a mirror image of the left-handed adjuster bracket. While the adjuster bracket can be made of any material, the adjuster bracket of this embodiment is a single molded piece of nylon.

Figure 5:
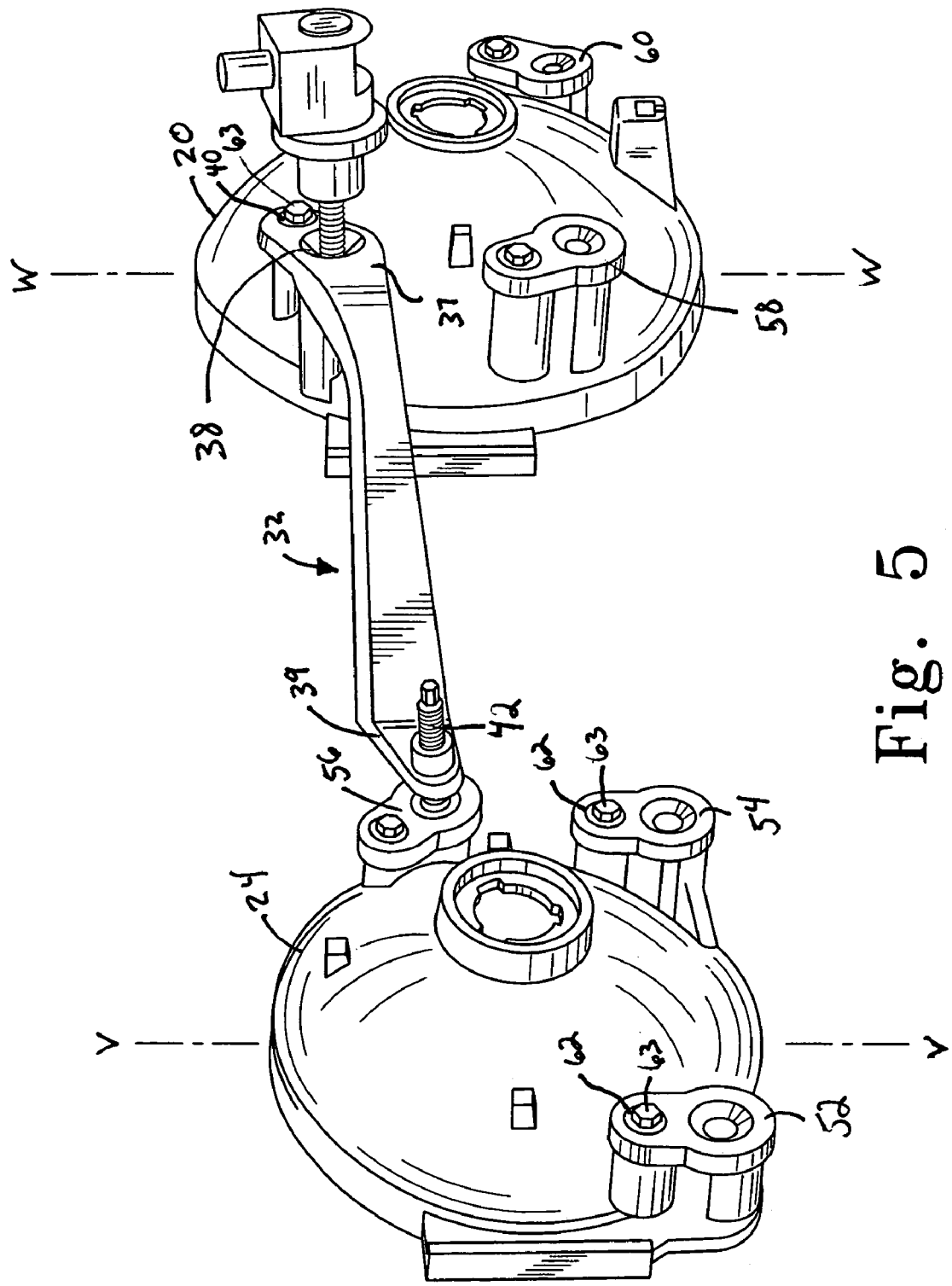
FIG. 5 is a perspective, backside view of the adjuster bracket attached to two reflectors and a standard gear adjuster.

FIG. 5 is a perspective, rear view of adjuster bracket 32 connected to high beam reflector 24 and low beam reflector 20. As shown in FIG. 5, high beam reflector 24 has three ball sockets mounted on its backside in a "L" configuration. In this embodiment, two of the ball sockets 52 and 54 are located on the lower portion of the backside of high beam reflector 24 and one ball socket 56 is located on the upper portion of the high beam reflector. Low beam reflector 20 has two ball sockets 58 and 60 mounted on the lower portion of its backside. While these ball sockets can be made of any material, each of the ball sockets 52, 54, 56, 58 and 60 of this embodiment are single molded pieces of nylon and have a receiving hole 62. Ball sockets 52, 54, 56, 58 and 60 are mounted to their respective reflectors by a bolt 63 that passes through each socket's receiving holes 62 and into the respective reflector, or any other attachment means well known in the art.

Still referring to FIG. 5, ball stud retaining end 39 of adjuster bracket 32 is attached to high beam reflector 24 by snapping ball head 44 (shown in FIG. 4) of ball stud 42 into ball socket 56. Ball socket end 37 of adjuster bracket 32 is mounted to low beam reflector 20 by bolt 63 or any other type of attachment means well known in the art. In this embodiment, bolt 63 passes through receiving hole 40 and into the back of the low beam reflector 20 in order to mount ball socket 38 and adjuster bracket 32 to the upper portion of the low beam reflector. Ball socket 38 forms an "L" configuration with ball sockets 58 and 60. In this embodiment, ball sockets 38 and 56 can be located anywhere on the upper portion of their respective reflectors. However, it is advantageous to position ball socket 38 on the upper backside portion of low beam reflector 20 closest to high beam reflector 24 and to position ball socket 56 on the upper backside portion of the high beam reflector closest to the low beam reflector.

Referring back to FIG. 3, lamp housing 16 has a plurality of ball head features 64 attached to the lamp housing. While the ball head features can be made of any material, the ball head features 64 of the embodiment are a single pieces of steel with a partially threaded shaft (not shown). The partially threaded shaft screws into a threaded receptacle (not shown) in the lamp housing in order to attach the ball head feature to the lamp housing. Alternatively, these ball head features could be molded as part of the lamp housing.

Two such ball head features 64 are located in high beam unit 14 at a position that corresponds to the location of ball sockets 52 and 54 on high beam reflector 24. Further, two ball head features 64 are located in the low beam unit 12 at a position that corresponds to the location of ball sockets 58 and 60 on low beam reflector 20. Lamp housing 16 further has an access slot 66 in the high beam unit 14 that corresponds to the location of adjustment ball stud 42 and a hole 68 with a plurality of notches in low beam unit 12 that corresponds to the location of ball socket 38 of adjustment bracket 32. Low beam reflector 20 and high beam reflector 24 are attached to lamp housing 16 by snapping each of the corresponding ball features 64 into the corresponding ball sockets 52, 54, 58 and 60. Once the reflectors are installed, hex shaped end 46 of ball stud 42 fits into access slot 66 and ball socket 38 is aligned with hole 68.

Figure 6:
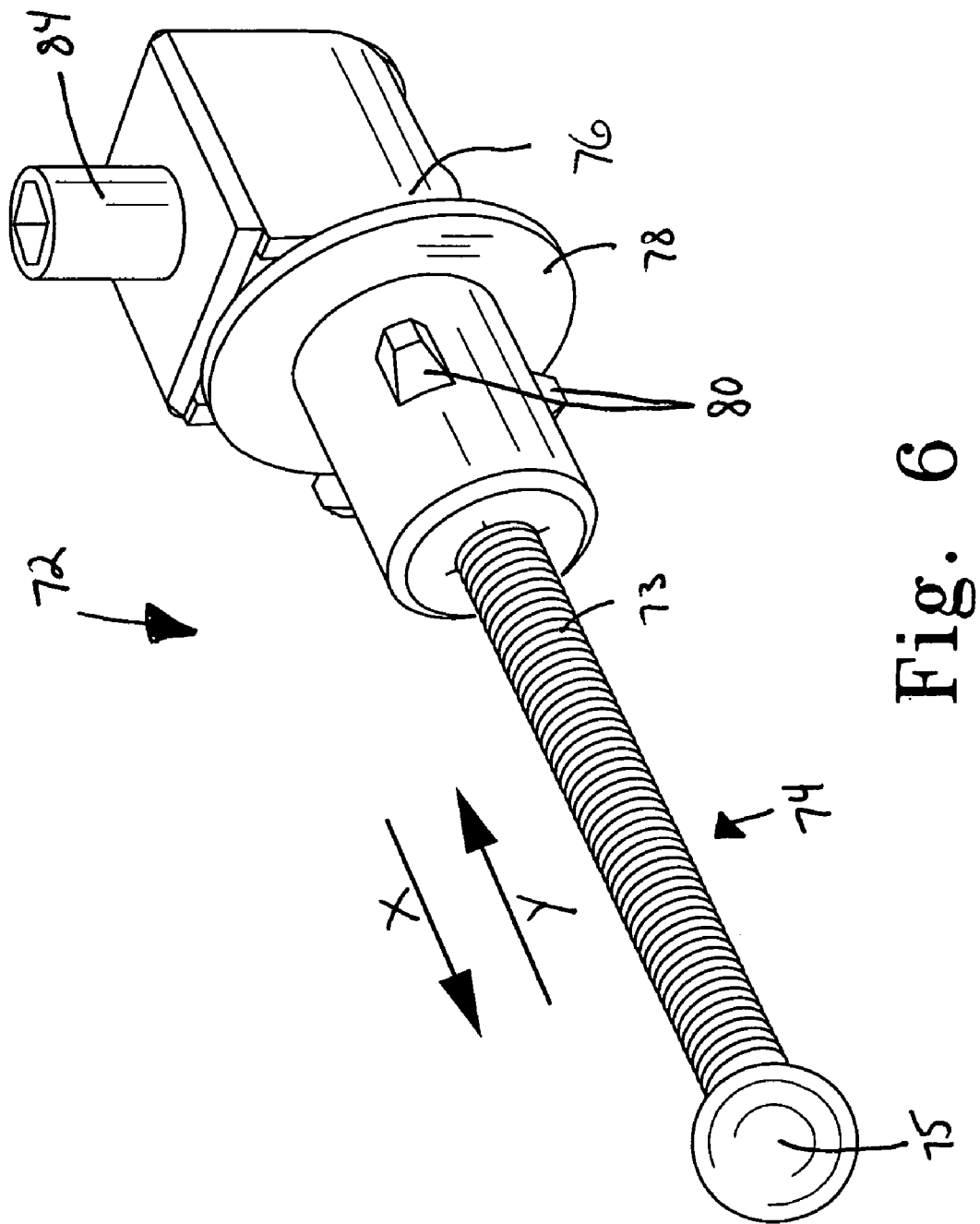
FIG. 6 is a perspective view of a standard gear adjuster that is connected to the adjuster bracket of FIG. 5.

Still referring to FIG. 3, lamp assembly 30 further comprises a gear adjuster 72. FIG. 6 shows a perspective view of gear adjuster 72. As shown in FIG. 6, gear adjuster 72 has a ball stud 74 with a ball head 75 and a threaded portion 73 that is inserted into a gear housing 76. Gear adjuster 72 also has a hexagonal cavity 84 that extends outward from housing 76. A driving tool with a hex head can be placed into cavity 84 in order to rotate the cavity. When cavity 84 is turned clockwise, it will cause a series of gears (enclosed by housing 76) to turn in a manner that will cause ball stud 74 to extend out of gear housing 76 (in the direction of arrow y). When cavity 84 is turned counter-clockwise, it will cause a series of gears to turn in a manner that will cause ball stud 74 to withdraw into gear housing 76 (in the direction of arrow x). Gear housing 76 has a face plate 78 positioned behind three locking features 80.

Referring back to FIG. 3, gear housing 76 has three locking features 80 that corresponds to the three notches located in lamp housing's hole 68. A rubber seal 82 is placed between these locking features 80 and face plate 78. Gear adjuster 72 is inserted into hole 68 so that each locking feature passes through its corresponding notch into lamp housing 16 and ball stud 74 extends into lamp housing 16 and snaps into ball socket 38 of adjuster bracket 32. Once gear adjuster 72 is inserted, gear housing 76 is turned clockwise or counter-clockwise so that the gear adjuster is locked into place on lamp housing 16. Locking features 80 will interact with the wall of lamp housing 16 in order to hold gear adjuster 72 in place. As the gear adjuster 72 is locked in place, seal 82 will be compressed between lamp housing 16 and face plate 78 in order to form a tight seal between the gear adjuster and lamp housing.

In this embodiment, high beam reflector 24 and low beam reflector 20 can be adjusted at the same time utilizing one mechanism. Referring to FIGS. 3 and 5, once headlamp assembly 30 is assembled, ball stud 42 can be accessed through access slot 66 from the backside of lamp housing 16. A tool, such as a socket wrench, can interact with ball stud's 42 hex shaped end 46 in order to either turn the adjustment ball stud clockwise or counter-clockwise. As ball stud 42 is turned clockwise, ball head 44 will extend away fram adjuster bracket 32 and into ball socket 56. As the ball head 44 extends, ball sockets 52 and 54 pivot about ball head features 64 and ball socket 56 pivots about ball head 44, so that the high beam reflector tilts downward (i.e., the top portion of the high beam reflector moves toward lens 28). In contrast, as ball stud 42 is turned counter-clockwise, ball head 44 will be withdrawn towards adjuster bracket 32 and away from ball socket 56. As the ball head 44 withdraws, ball sockets 52 and 54 pivot about ball head features 64 and ball socket 56 pivots about ball head 44 so that the high beam reflector tilts upward (i.e., the top portion of the high beam reflector will be pulled away from lens 28). Thus, by turning adjustment screw 42 either clockwise or counter-clockwise, the vertical axis v—v of the high beam reflector 24 (shown in FIG. 5) can be aligned with the vertical axis w—w of low beam reflector 20 (shown in FIG. 5) so that the two vertical axes are parallel to one another (or aligned in another desired orientation).

After the axes w—w and v—v are aligned with one another, access slot 66 is capped so that adjustment ball stud 42 can no longer be accessed. Gear adjuster 72 then can be utilized to move the high and low beam reflectors and the adjuster bracket simultaneously and in the same direction in order to properly aim the high and low light beams generated by the high bean and low beam units. Gear drive 72 acts in the same manner as ball stud 42 to move high and low beam reflectors 20 and 24. As shown in FIG. 6, cavity 84 of gear adjuster 72 can be turned either clockwise or counter-clockwise in order to extend (arrow y) or withdraw (arrow x) ball stud 74. When cavity 84 is turned clockwise, ball stud 74 will extend into ball socket 38. As ball stud 74 extends, ball sockets 58 and 60 pivot about ball features 64 and ball socket 38 pivots about ball stud 74 so that the low beam reflector tilts downward. As low beam reflector 20 tilts forward, adjuster bracket 32 moves forward and causes high beam reflector 24 to tilt forward at the same time and at the same degree as low beam reflector 20. Thus, as ball stud 74 extends, ball sockets 52 and 54 also pivot about ball features 64 and ball socket 56 pivots about ball head 44 so that high beam reflector 20 tilts forward. The same process will occur when cavity 84 is turned counter-clockwise in order to withdraw ball stud 74 into the gear housing 76 and cause both the low beam and high beam reflectors to tilt upward at the same time and at the same degree. In this manner, the high and low beam reflectors and adjuster bracket are all moved simultaneously. While a gear adjuster is used in this embodiment, a ball stud, such as ball stud 42, could be used instead of the gear adjuster.

One embodiment of the high/low beam adjuster bracket assembly is described herein, but many more embodiments exist. For example, adjuster bracket 32 does not need to comprise ball socket 38. Instead, ball socket 38 could be a separate piece that is mounted to low beam reflector in the same manner as the rest of the ball sockets 52, 54, 56, 58 and 60 are mounted to their respective reflectors. In such an embodiment, ball stud retaining end would still be attached to high beam reflector 24 and gear adjuster 72 would still be connected to ball socket 38 as already described. However, in this embodiment, extension 48 of adjuster bracket 32 would be mounted directly to low beam reflector 20. Thus, high beam and low beam reflectors 24 and 22 would still be connected by adjuster bracket 32 and the reflectors would still be adjusted in the same manner as already described.

In another embodiment, ball sockets 52, 54, 56, 58, 60 and 38 could be arranged in different positions on the reflector to form different arrangements. Referring to FIG. 5, ball sockets 52 and 54 could be located on the top portion of high beam reflector 24 and ball socket 56 could be located on the bottom portion of high beam reflector 24. Similarly, ball sockets 58 and 60 could be located on the top portion of low beam reflector 20 and ball socket 38 could be located on the bottom portion of low beam reflector 20. Adjuster bracket 32 would then be connected to the lower portion of the high and low beam reflectors. High and low beam reflectors 24 and 20 would still be adjusted and aimed in the manner already described except that the bottom portion of the respective reflectors would move towards and away from lens 28 in order to tilt the reflectors upward or downward.

While the subject invention has been described in considerable detail with references to particular embodiments thereof, such is offered by way of non-limiting examples of the invention as many other versions are possible. For example, ball head features 64 can be mounted on the backside of both low beam and high beam reflectors 20 and 24 while ball sockets 52, 54, 58 and 60 are mounted to lamp housing 16. Further, instead of ball socket 30 being connected to low beam reflector 20 and ball stud 42 connected to high beam reflector 24, ball socket 38 could be connected to high beam reflector 24 and ball stud 42 could be connected to low beam reflector 20. While these are two examples of different versions of the subject invention, it is anticipated that a variety of other modifications and changes will be apparent to those having ordinary skill in the art and that such modifications and changes are intended to be encompassed within the spirit and scope of the pending claims.

We claim:

1. An automotive headlamp assembly comprising:
   a. a first adjustable reflector;
   b. a second separately adjustable reflector having at least one ball socket;
   c. an adjuster bracket having two ends, at least one of which comprises a threaded cylinder, the adjuster bracket connecting the first reflector to the second reflector and being arranged and disposed on the first and second reflectors, so that the first reflector, second reflector and adjuster bracket will move simultaneously when the first reflector is adjusted; and
   d. a first ball stud that is threaded through the threaded cylinder and retained by the second reflector's at least one ball socket.

2. The automotive headlamp assembly of claim 1, wherein the first ball stud can be extended or withdrawn so that the second reflector is adjusted vertically without moving the first reflector.

3. The automotive headlamp assembly of claim 1, wherein the other end of the adjusted bracket comprises a ball socket that is attached to the first reflector.

4. The automotive headlamp of claim 3, further comprising a second ball stud.

5. The automotive headlamp assembly of claim 4, wherein the second ball stud fits into and is retained by the adjuster bracket's ball socket.

6. The automotive headlamp assembly of claim 5, wherein the second ball stud can be extended or withdrawn so that the first and second reflectors simultaneously move in a vertical direction.

7. The automotive headlamp assembly of claim 6, further comprising a gear drive that interacts with the second ball stud, wherein the gear drive can cause the second ball stud to extend and withdraw.

8. A method of utilizing a single mechanism for vertically adjusting a high beam reflector and a low beam reflector in the same direction and at the same time, the method comprising the steps of:
   a. providing a headlamp assembly having:
      (i) a first reflector with a first adjustable vertical axis.
      (ii) a second reflector with a second vertical axis, and
      (iii) an adjuster bracket with a first end connected to the first reflector and a second separately adjustable end connected to the second reflector;
   b. providing a first ball stud and a second ball stud;
   c. connecting the first ball stud to the first end of the adjuster bracket and the first reflector;
   d. connecting the second ball stud to the second end of the adjuster bracket and the second reflector;
   e. extending or withdrawing the second ball stud to align the second vertical axis of the second reflector with the first vertical axis of the first reflector so the second and first axes are substantially parallel to one another; and
   f. extending or withdrawing the first ball stud to simultaneously adjust the first reflector, which moves the first and second reflectors in the same direction and in substantially parallel planes after aligning the first and second vertical axes.

9. The method claim of 8, further comprising attaching a gear adjuster to the first ball stud.

10. The method of claim 9, wherein the step of withdrawing and extending the first ball stud further comprises operating the gear adjuster to extend or withdraw the first ball stud.

11. An automotive headlamp assembly comprising:
   a. a first adjustable reflector having at least one ball socket;
   b. a second separately adjustable reflector having at least one ball socket;
   c. a means for adjusting the first reflector connected to the first reflector's ball socket;
   d. a means for connecting the first reflector to the second reflector, such that any adjustment of the first reflector using the means for adjusting the first reflector will cause a corresponding adjustment in the second reflector; and
   e. a ball stud retained by the second reflector's ball socket and connected to the means for connecting the first reflector to the second reflector, such that when the ball stud is extended or withdrawn the ball stud will move the second reflector without moving the first reflector.

12. An automotive headlamp assembly of claim 11, wherein the means for connecting the first reflector to the second reflector is an adjuster bracket having at least one end that comurises a threaded portion through which the ball stud is threaded.

13. An automotive headlamp assembly of claim 12, wherein the means for adjusting the first reflector is a ball stud.

14. An automotive headlamp assembly of claim 12, wherein the means for adjusting the first reflector is a gear adjuster.

* * * * *